Patented Aug. 6, 1935

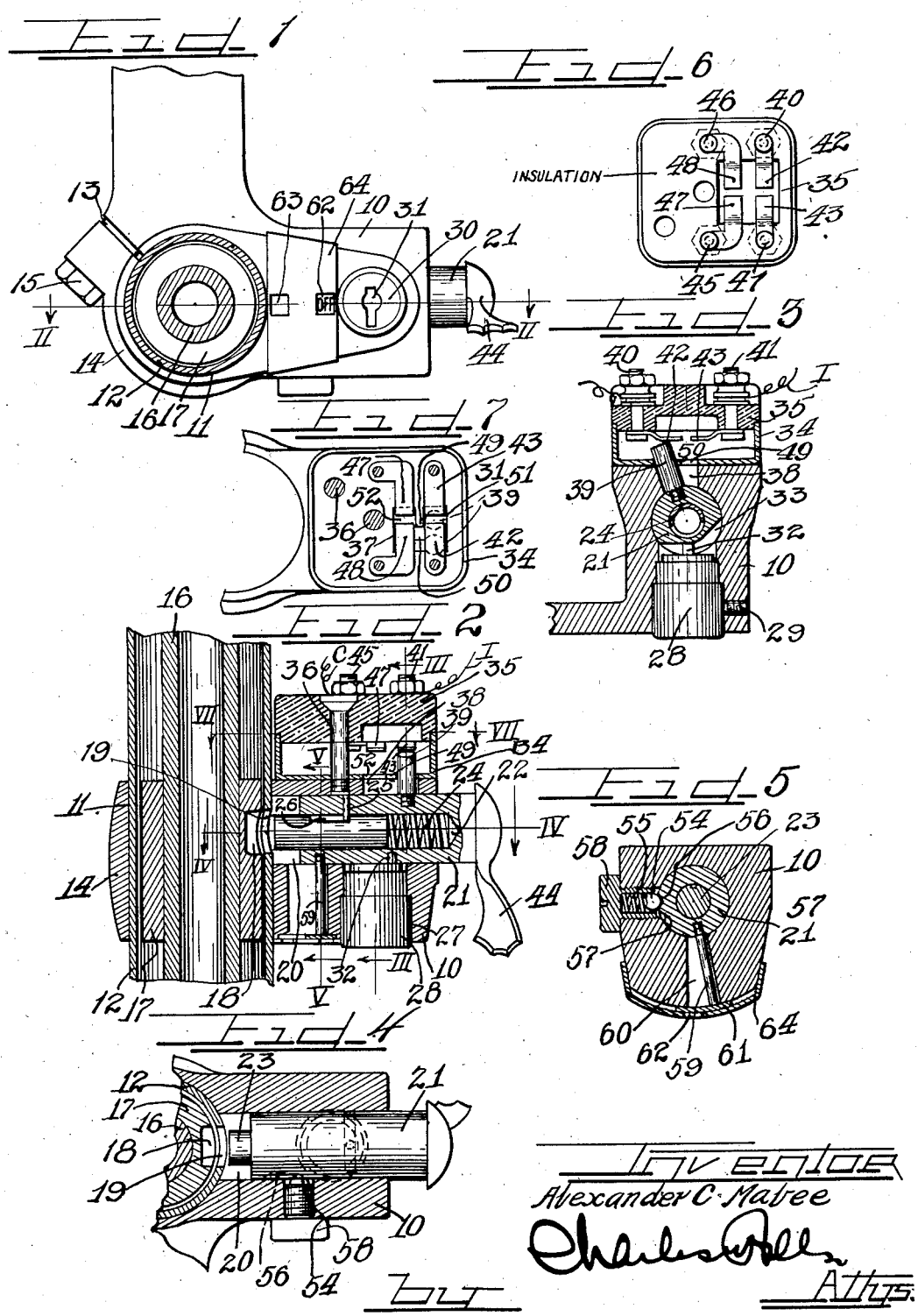

2,010,100

UNITED STATES PATENT OFFICE 2,010,100

AUTOMOBILE LOCK

Alexander C. Mabee, Villa Park, Ill., assignor to Oakes Products Corporation, North Chicago, Ill., a corporation of Michigan Application March 20, 1933, Serial No. 661,710

2 Claims. (Cl. 200—55)

My invention relates to lock structures for locking the steering and the ignition on an automotive vehicle and refers particularly to the type of lock structure in which locking or unlocking of the steering is accomplished by axial reciprocation of a lock bolt and the control of the ignition circuit is accomplished by rotation of the lock bolt.

An important object of the invention is to provide an arrangement in which the locking bolt is rotatable in its steering locking position as well as steering unlocking position but with the ignition controlling switch operable by rotation of the bolt only when the bolt is in steering unlocking position and with provision for preventing shift of the bolt back to locking position while the ignition switch is closed.

A further object of the invention is to provide circuit controlling or switch means independent of the ignition circuit controlling switch means and operable by the rotation of the locking bolt when the bolt is in its steering locking position.

Another object is to provide an arrangement whereby the locking bolt is held against axial shift to steering unlocking position while the additional or independent switch means is in a certain position of circuit control.

The various features of my invention are shown incorporated in the structure disclosed on the drawing, in which drawing Figure 1 is a plan view of the lock structure with the steering post and shaft to which the lock structure is applied in section;

Figure 2 is a section on plane II—II of Figure 1;

Figure 3 is a section on plane III—III of Figure 2;

Figure 4 is a section on plane IV—IV of Figure 2;

Figure 5 is a section on plane V—V of Figure 2;

Figure 6 is an inside view of the switch terminal supporting cover for the switch housing; and Figure 7 is a sectional view on plane VII—VII of Figure 2.

The lock structure comprises a laterally extending body 10 having a cylindrical vertical passageway for receiving the steering column 12 of an automobile, a slot 13 leaving the semicircular section 14 of the body yieldable so that it may be clamped by a screw 15 to securely hold the body to the steering column. Extending through the steering column is the steering shaft 16 connected at its axis with the steering wheel (not shown), this shaft having a collar 17 secured thereto provided with a locking slot 18 which will be in register with the passageway 19 thru the steering column when the steering wheel is in a certain position, usually in position for straight ahead travel of the front wheels.

The body 10 has the cylindrical bore 20 therethrough in register with the passageway 19 through the steering column and in this bore 20 a locking bolt 21 is adapted for reciprocation and also rotation. The locking bolt has a longitudinally extending pocket 22 for guiding the locking bar 23, a spring 24 behind the bar tending to shift it outwardly. The movement of the locking bar in the locking bolt is limited by the engagement of a pin 25 with the ends of a groove 26 cut in the bar.

A cylindrical passage or pocket 27 extends through the body 10 and communicates at its inner end with the bore 20 and receives a lock cylinder 28 which may be secured in place by a suitable screw or pin 29. The lock barrel 30, which may be turned by a proper key inserted in the hole 31, terminates at its inner end in a cam member 32 which is eccentric relative to the lock barrel axis and engages in the transverse slot 33 in the locking bolt, so that when the barrel is turned by the key, the locking bolt will be shifted axially either to steering locking or unlocking position. The lock barrel has a maximum rotation of 180° and at the end of each movement the cam 32 will lock the locking bolt in the corresponding position to which it has been shifted. When the locking bolt is shifted inwardly at a time when the notch 18 of the steering shaft is in alignment with the passage 19 of the steering column, the locking bar 23 will enter the notch and lock the steering shaft. If the notch 18 is not in register with the passageway 19, then the locking bar 23 will abut against the cylindrical surface of the collar 17 until such time as the steering wheel is rotated to bring the notch into alignment with the passage 19, the spring 24 then forcing the locking bar into the notch.

Describing now the switch mechanisms controlled by the rotational movement of the locking bolt, a rectangular switch casing 34, which is preferably of sheet metal, is applied with its bottom against the back of the housing 10 and has a removable cover or closure plate 35, preferably of insulating material, which serves to support switch and circuit terminals, screws 36 extending through the cover plate and the switch case bottom and threading into the housing 10 serve to secure the switch supporting structure to the housing.

The bottom of the switch casing has a rectangular opening 37 registering with the rectangular passageway 38 in the housing 10 and a switch arm 39 is secured to the locking bolt 21 and extends radially therefrom through the registering openings and into the switch casing 34.

The insulating cover 35 for the switch casing supports two terminal posts 40 and 41 whose heads at their inner ends secure switch springs 42 and 43 at their outer ends against the inner face of the cover 35, these switch springs extending toward each other but separated at their ends by a gap. These springs are positioned to be in register with the switch arm 39 when the locking bolt 21 is in its outer or steering unlocking position, so that when the locking bolt is then rotated in one direction, the end of the switch arm will be away from the gap between the switch springs, and when the locking bolt is rotated in the opposite direction, the switch arm end will span the gap and electrically connect the switch springs for closure of a circuit connected with the terminal posts 40 and 41. The locking bolt 21 is provided with an arm or lever 44 whereby it may be readily rotated.

I provide a second set of terminal posts 45 and 46 which secure switch springs 47 and 48 at one end against the inner face of the cover 35 with the springs extending toward each other but separated by a gap. These springs are in position for cooperation with the switch arm 39 when the locking bolt 21 is in its inner or steering locking position, so that a circuit controlled by the switch terminals may be opened and closed by the rotation of the locking bolt when in its steering locking position. I preferably utilize the outer switch terminals 41 and 42 for controlling the ignition circuit I, and the inner switch terminals 47 and 48 may be used for controlling some other circuit C (Fig. 2).

The opening 37 in the bottom of the switch casing 34 has a tongue 49 extending thereinto from one side thereof. This tongue divides the opening into a passage 50 extending parallel with the axis of the locking bolt 21, and outer and inner passageways 51 and 52 extending at right angles to the axis of the locking bolt. When the locking bolt is rotated, it will bring the switch arm 39 into the longitudinally extending passageway 50. The locking bolt is then free to be shifted axially either to steering locking or unlocking position, but when the bolt has been rotated to swing the switch arm into either one of the transverse passageways 51 and 52, the tongue 49 will act as a stop for the switch arm 39 and will prevent axial shift of the locking bolt and the bolt must first be rotated to swing the switch arm back to the longitudinal passageway 50 before it can be again axially shifted.

In the position shown in Figures 2 and 3 on the drawing, the locking bolt is in its outer or steering unlocking position and the switch arm 39 is at the outer end of the longitudinal passageway 50, the ignition circuit I being open. Upon oscillation of the locking bolt the switch arm will be swung into the transverse passageway 51 for connection of the switch terminals 42 and 43 by the switch arm, and closure of the ignition circuit. Before the locking bolt can be shifted back to steering locking position from its ignition circuit closing position, it will have to be rotated back to swing the switch arm back into the longitudinal passageway 50, and then when the locking bolt has been shifted to steering locking position, the switch arm will be in alignment with the inner transverse passageway 52. The locking bolt can then be rotated for connection of the switch terminals 47 and 48 by the switch arm and closure of the circuit C. Before the locking bolt can then be shifted outwardly to steering unlocking position, it will have to be rotated to swing the switch arm back to the longitudinal passageway 50 and to open the circuit C. Thus, with the arrangement shown, either circuit must first be opened by rotation of the locking bolt before the bolt can be shifted axially for control of the steering.

To yieldably hold the locking bolt in position after rotation thereof, a detent in the form of a ball 54 is provided yieldably held by a spring 55 in either one of the notches 56 and 57 in the locking bolt, the spring and ball being held within a plug 58 threading into the body 10.

I also provide indicating means for visual indication of the position of the locking bolt and the condition of the circuits controlled thereby. A pin 59 extends from the locking bolt through a passageway 60 in the body 10 and at its outer end carries a dial plate 61 having the indications "on" and "off" thereon. This dial plate cooperates with sight openings 62 and 63 in an escutcheon plate 64 secured to the body 10, between which escutcheon plate and the adjacent face of the body the dial 61 travels. In the condition of the lock as indicated on Figures 1 and 2, the locking bolt has been shifted outwardly to unlock the steering, but the ignition switch has not yet been closed, so that the indication "off" appears in the sight opening 62 to indicate that the ignition circuit is open. Upon rotation of the locking bolt to close the ignition circuit, the indication "on" will be brought into the sight opening 62. If the lock bolt is shifted inwardly from the position shown in Figures 1 and 2, to lock the steering, the indication "off" will appear at the sight opening 63 to indicate that the switch controlling the circuit C is open; then upon rotation of the bolt and closure of the switch the indication "on" will appear at the sight opening 63 to indicate that the circuit C is closed. The passageway 60 is of sufficient width for travel of the pin 59 with the locking bolt to carry the dial 61 for cooperation with the respective sight openings 62 and 63.

I thus disclose a simple economically manufactured lock structure in which a locking bolt may be shifted axially into and locked in either steering locking or steering unlocking position and which is rotatable in either of said positions for controlling switch mechanisms, and in which the locking bolt is held against axial shift to either of its positions while the switch mechanisms are in circuit closing condition.

It is also evident that the switch structure, which is operable by rotation of the locking bolt when in its unlocking position, may be utilized for controlling circuits other than the ignition circuit, as for example the circuit for the engine starting motor.

I do not desire to be limited to the exact construction, arrangement and operation shown and described as changes and modifications may be made without departing from the scope of the invention as defined by the appended claims.

I claim as follows:

1. A lock comprising in combination a first switch and a second switch, a switch-actuating member common to both of said switches and adapted to provide a locking bolt for said lock, said member being shiftable axially to locking or unlocking position and being rotatable to actuate said switches, said lock being provided with means whereby said member is selectively rotatable to actuate said first switch only when said member is in the locking position and to actuate said second switch only when said member is in the unlocking position.

2. A lock comprising in combination a first switch and a second switch, a switch-actuating member common to both of said switches and adapted to provide a locking bolt for said lock, said member being shiftable axially to locking or unlocking position and being rotatable to actuate said switches, said lock being provided with means whereby said member is selectively rotatable to actuate said first switch only when said member is in the locking position and to actuate said second switch only when said member is in the unlocking position, and means for locking said member against axial movement during rotational movement thereof while controlling either of said switches.

ALEXANDER C. MABEE.